United States Patent
Xue et al.

(10) Patent No.: US 10,116,753 B2
(45) Date of Patent: Oct. 30, 2018

(54) SYSTEM AND METHOD FOR SUPPORTING DATA COMMUNICATION IN A HETEROGENEOUS ENVIRONMENT

(71) Applicant: SZ DJI TECHNOLOGY CO., LTD., Shenzhen (CN)

(72) Inventors: Bing Xue, Shenzhen (CN); Zhongqian You, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/349,151

(22) Filed: Nov. 11, 2016

(65) Prior Publication Data

US 2017/0064006 A1 Mar. 2, 2017

Related U.S. Application Data

(63) Continuation of application No. PCT/CN2015/086991, filed on Aug. 14, 2015.

(51) Int. Cl.
*H04L 29/08* (2006.01)
*H04W 4/80* (2018.01)

(52) U.S. Cl.
CPC ............ *H04L 67/141* (2013.01); *H04L 67/12* (2013.01); *H04L 67/146* (2013.01); *H04L 67/20* (2013.01); *H04W 4/80* (2018.02)

(58) Field of Classification Search
CPC ....... H04L 67/20; H04L 67/141; H04L 67/12; H04L 67/146; H04W 4/80
See application file for complete search history.

(56) References Cited

U.S. PATENT DOCUMENTS

| 7,380,025 | B1 * | 5/2008 | Riggins ............... H04L 41/0809 710/10 |
| 7,644,217 | B2 | 1/2010 | Butler et al. |
| 9,756,501 | B2 * | 9/2017 | Ardiri .................. H04W 8/186 |
| 2002/0169915 | A1 * | 11/2002 | Wu ..................... G06F 13/4081 710/305 |
| 2005/0055471 | A1 | 3/2005 | Payne et al. |
| 2012/0057075 | A1 * | 3/2012 | Kabuto ..................... G06F 3/14 348/564 |
| 2013/0045803 | A1 * | 2/2013 | Kang .................. G07F 17/3223 463/42 |

(Continued)

FOREIGN PATENT DOCUMENTS

| CN | 201667067 | 12/2010 |
| JP | 2004-118261 | 4/2004 |

(Continued)

*Primary Examiner* — Oanh Duong
(74) *Attorney, Agent, or Firm* — Finnegan, Henderson, Farabow, Garrett & Dunner, LLP

(57) ABSTRACT

System and method can support data communication in a heterogeneous environment. The system can establish a connection between a first device and a second device, wherein the connection is based on a protocol, which associates a host mode or an accessory mode with one or more connected devices. Furthermore, a controller on the first device can determine a device type associated with the second device, and can configure the first device to be in either the host mode or the accessory mode, based on the determined device type associated with the second device, to handle data communication between the first device and the second device.

30 Claims, 6 Drawing Sheets

(56) References Cited

U.S. PATENT DOCUMENTS

| | | | | |
|---|---|---|---|---|
| 2013/0275779 A1* | 10/2013 | He | ............................. | G06F 1/26 |
| | | | | 713/300 |
| 2014/0115202 A1* | 4/2014 | Yoshinaga | ............ | G06F 13/426 |
| | | | | 710/62 |
| 2014/0240088 A1* | 8/2014 | Robinette | .......... | G08B 13/1427 |
| | | | | 340/5.61 |
| 2015/0309954 A1* | 10/2015 | Moore | .................. | G06F 13/426 |
| | | | | 710/316 |

FOREIGN PATENT DOCUMENTS

| | | |
|---|---|---|
| JP | 2009-009210 | 1/2009 |
| JP | 2009-009211 | 1/2009 |
| JP | 2010-226698 | 10/2010 |
| JP | 2014-085857 | 5/2014 |
| WO | WO 2011/120774 A1 | 10/2011 |

* cited by examiner

SYSTEM AND METHOD FOR SUPPORTING DATA COMMUNICATION IN A HETEROGENEOUS ENVIRONMENT

CROSS-REFERENCE TO RELATED APPLICATIONS

This application is a continuation application of International Application No. PCT/CN2015/086991 filed on Aug. 14, 2015, the content of which is hereby incorporated by reference in its entirety.

BACKGROUND OF THE INVENTION

The disclosed embodiments relate generally to information technologies and more particularly, but not exclusively, to data communication.

The success of mobile technologies such as the smart phone and tablet leads to the explosive development of new technologies, e.g. smart hardware and the Internet of Things (IoT). For example, smart hardware, which includes the smart home appliances, smart monitoring devices and unmanned aerial vehicles (UAVs), can be used along with the different mobile platforms to achieve better user experience.

Various wireless technologies can be used for connecting devices to a network resource such as the Internet. The communication link may be established using Wi-Fi technology, e.g. via a wireless network access point. The Wi-Fi link, which is based on a client/server model, is easy to develop and can provide sufficient bandwidth that is enough for supporting a large variation of applications. For example, the communication can be established over a network with external routers using standard sockets based on the Wi-Fi technology.

However, the Wi-Fi technology may require a full-fledged operating system for supporting the TCP/IP transport protocol. Thus, the device based on the Wi-Fi technology may need to have a processor with high performance capability for supporting this operating system, which may consume substantial amount of resource available to the device.

Additionally, the Wi-Fi technology is not ideal for application with high security requirements. Using the Wi-Fi technology, the devices may be exposed on the network, which is prone to malicious attacks. Also, the Wi-Fi technology may not be suitable for transporting large amount of data in real time (e.g. performing video broadcasting), since the wireless protocols (like other wireless protocols) is easy to be interfered and may suffer delay in data transport. Moreover, the high energy consumption by the Wi-Fi technology may significant reduce the battery life of the smart devices.

Alternatively, the Bluetooth technology can be used for supporting short-range low-volume data communication. The Bluetooth communication connection is simple to implement and easy to establish network. Also, the Bluetooth technology consumes relatively lower power and enjoys high communication security.

However, the Bluetooth technology is not suitable for performing real-time high-volume data transmission, since the bandwidth is small (e.g. around 1 Mbit). Also, the Bluetooth protocol stack is complex and difficult to handle, usually requires the purchase of a Bluetooth module (i.e. involving extra hardware cost). In addition, the user experience for the Bluetooth technology is not ideal, since the devices need to be paired before the actual usage.

Hence, there is a need for easily, reliably and securely connecting the smart devices with different mobile platforms to achieve better user experience. This is the general area that embodiments of the invention are intended to address.

BRIEF SUMMARY OF THE INVENTION

Described herein are systems and methods that can support data communication in a heterogeneous environment. The system can establish a connection between a first device and a second device, wherein the connection is based on a protocol, which associates a host mode or an accessory mode with one or more connected devices. Furthermore, a controller on the first device can determine a device type associated with the second device, and can configure the first device to be in either the host mode or the accessory mode, based on the determined device type associated with the second device, to handle data communication between the first device and the second device.

Other objects and features of the present invention will become apparent by a review of the specification, claims, and appended figures.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings briefly described herein.

DETAILED DESCRIPTION OF THE INVENTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses a universal serial bus (USB) protocol as example for a data communication protocol. It will be apparent to those skilled in the art that other types of data communication protocols can be used without limitation.

In accordance with various embodiments of the present invention, the system and method can handle the connection between a device, e.g. a third party smart hardware, with devices based on different mobile platforms, such as the Android platform and the IOS platform.

Figure 1:
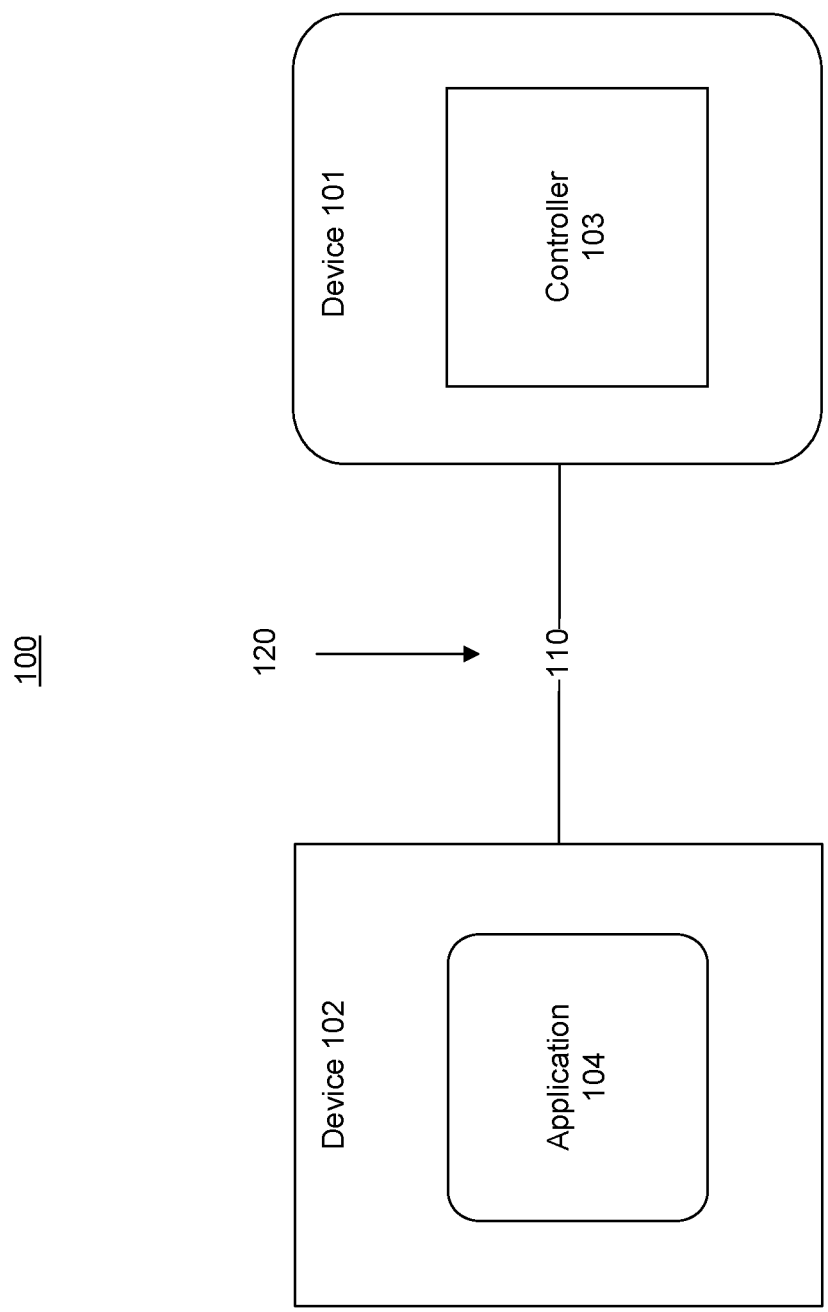
FIG. 1 is an exemplary illustration of establishing data communication between different devices, in accordance with various embodiments of the present invention.

FIG. 1 is an exemplary illustration of establishing data communication between different devices, in accordance with various embodiments of the present invention. As shown in FIG. 1, a data communication environment 100 includes a device 101 and a device 102, which can exchange data via a connection 110.

The connection 110 can be based on a data communication protocol 120, e.g. the Universal Serial Bus (USB) protocol. The USB protocol, which uses a USB bus, allows only one device on the USB bus to be in the host mode, and the device in the host mode powers the bus and enumerates other devices that connect with the device in the host mode.

The USB protocol has the advantage of high-bandwidth, low-latency, and low-cost. Thus, the USB protocol can be used for supporting high-volume real-time data transmission, such as real-time video broadcasting. Additionally, the USB bus supports hot-plug and flexible power supply, and can be used for supporting processor peripherals Furthermore, the connection 110 can be based on other communication protocols, such as the Wi-Fi protocol and the Bluetooth protocol. Also, the USB interface can be used as a charging interface As shown in FIG. 1, the device 101 can include a controller 103, which controls the state of the connection 110 that is related to the device 101. For example, the state can be either a host mode (e.g. the HOST mode as prescribed by the USB protocol) or an accessory mode (e.g. the DEVICE mode) that can be associated with the connected devices 101-102.

In accordance with various embodiments of the present invention, once the device 102 is physically connected with the device 101, the controller 103 can determine a device type associated with the device 102. For example, the controller 103 can determine the device type associated with a device based on a device descriptor, such as a vendor identifier (VID) and/or a product identifier (PID).

Based on the determined device type associated with the device 102, the controller 103 can configure the device 101 in either a host mode or an accessory mode for handling data communication between the first device and the second device. For example, the device 101 can be configured in a host mode (e.g. the USB HOST MODE) as default.

Then, via the connection 110, the device 101 can send one or more video data to an application 104 on the device 102, and receive one or more commands from the application 104 on the device 102.

Figure 2:
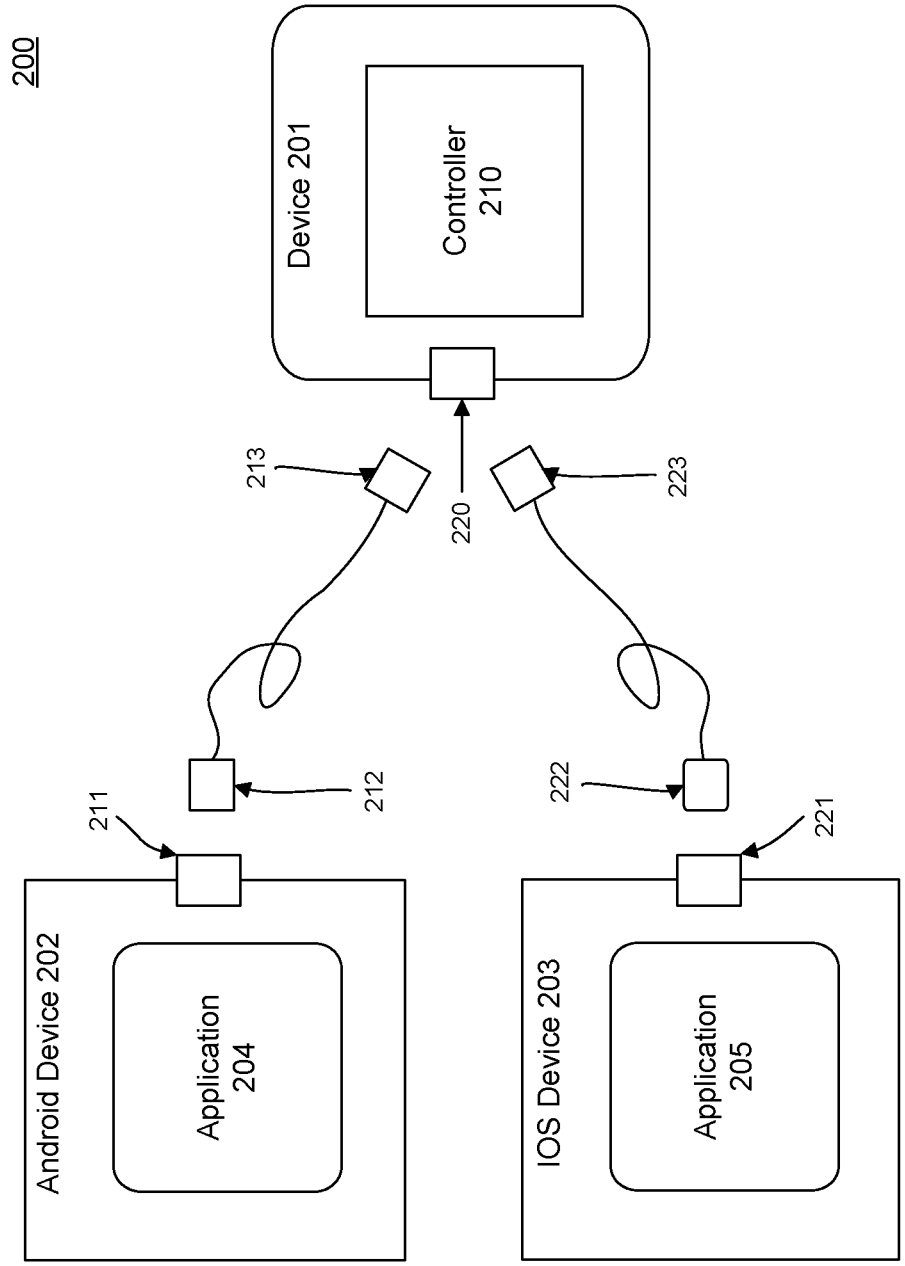
FIG. 2 is an exemplary illustration of supporting data communication in a heterogeneous environment, in accordance with various embodiments of the present invention.

FIG. 2 is an exemplary illustration of supporting data communication in a heterogeneous environment, in accordance with various embodiments of the present invention. As shown in FIG. 2, a device 201 can be connected with different types of devices in a heterogeneous environment 200.

In accordance with various embodiments of the present invention, these different types of devices (or terminals) may use different USB interfaces. Due to the differences between the various USB interfaces, a third-party hardware may need to provide different types of connectors for connecting to the different types of devices (or terminals), which increases the difficulty for industrial design and causes more hardware cost.

For example, the ANDROID devices may use the sockets based on the MICRO USB standard, while the IOS devices use the sockets based on the LIGHTNING standard. In order to support both the MICRO USB interface and the LIGHTNING interface, a third-party hardware may need to provide different sockets: a MICRO USB socket for connecting to the ANDROID devices and a LIGHTNING socket for connecting to the IOS devices.

In accordance with various embodiments of the present invention, the system can use the same socket for connecting a device 201 with different types of devices in the heterogeneous environment 200.

As shown in FIG. 2, the device 201 can use a socket 220 for connecting with an IOS device 203 and an Android device 202. For example, the device 201 can be a third-party accessory that provides an external physical interface, e.g. a USB TYPE A socket. Also, the device 201 can have a processor with USB On-The-Go (OTG) peripheral, with the USB OTG be configured in the USB HOST MODE.

A USB cable can be used for connecting the ANDROID device 202 with the device 201, with a connector 212 plugged into a MICRO USB socket 211 and a connector 213 plugged into a USB TYPE A socket 220. Alternatively, a different USB cable can be used for connecting the IOS device 203 with the device 201, with a connector 222 plugged into a LIGHTNING type socket 211 and a connector 223 plugged into the USB TYPE A socket 220.

Additionally, it is beneficial for a third-party device 201 to use a socket, such as the USB TYPE A socket 220, which may also be used as a charging interface, since a user can use an original charging cable for connecting the different mobile devices 202-203 with the third-party device 201.

After the device 201 is connected with the Android device 202, the device 201 can use a communication interface, e.g. an Android Open Accessory (AOA) interface, for exchanging data with the application 204 on the Android device 202. Also, the device 201 can use a communication interface, e.g. a Made for IOS (MFI) interface, for exchanging data with the application 205 on the IOS device 202, after the device 201 is connected with the IOS device 202.

Figure 3:
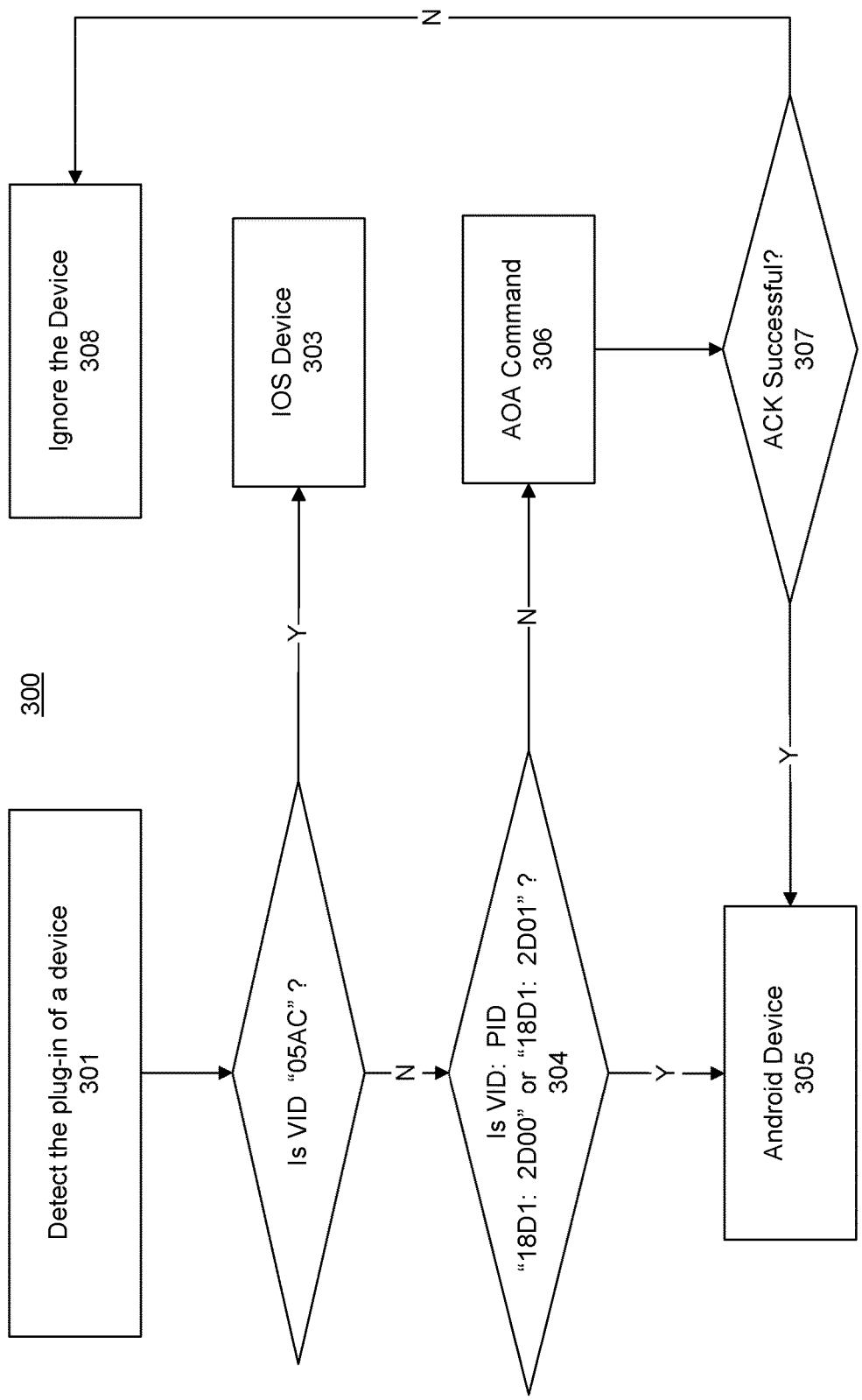
FIG. 3 is an exemplary illustration of determining a device type for a connected device, in accordance with various embodiments of the present invention.

FIG. 3 is an exemplary illustration of determining a device type for a connected device, in accordance with various embodiments of the present invention. As shown in FIG. 3, a controller for a third party device can detect the device type associated with a connected device in a heterogeneous environment 300, e.g. determining whether the connected device is an android device or an IOS device.

At step 301, a third party device can detect the plugging-in of a connector into a socket on the third party device. The controller on the third party device can (request and) obtain a device descriptor for the device, such as a vendor identifier (VID) and/or a product identifier (PID) for the device.

At step 302, the controller can check whether the detected descriptor matches the IOS descriptor (e.g. whether the VID is "05AC"). At step 303, the controller can determine that the device is an IOS device when the detected descriptor matches IOS descriptor (i.e. the VID is 05AC).

In accordance with various embodiments of the present invention, the system can check whether a connected device is associated with a closed system, before checking whether the connected device is associated with an open system. The reason is that a device for a closed system, such as an IOS system, is likely to have one or more unique descriptor(s), while the same reasoning may not always be true for an open system such as the ANDROID system.

In other words, a connected device with a device descriptor other than the IOS descriptor is not an IOS device. On the other hand, there is a chance that a connected device with a device descriptor other than the ANDROID descriptor may actually be an ANDROID device.

At step 304, when the detected descriptor does not match the IOS descriptor (i.e. the VID is not "05AC"), the controller can check whether the detected descriptor matches the ANDROID descriptor (e.g. whether the VID:PID is "18D1:2D00" or "18D1:2D01").

At step 305, the controller can determine that the device is an ANDROID device, when the detected descriptor matches the ANDROID descriptor (i.e. when the VID:PID is "18D1:2D00" or "18D1:2D01").

Furthermore, since there are chances that the connected device may actually be an ANDROID device even when the detected descriptor does not match the ANDROID descriptor. At step 306, the controller can send an AOA control command to the connected device to explicitly initiating the communication. Then, at step 307, the controller can check whether a successful acknowledgment (ACK) is received from the connected device. If a successful acknowledgment (ACK) is received, the controller can determine that the device is an ANDROID device. Otherwise, at step 308, the controller may ignore the device, and consider the type of the device is unknown.

Figure 4:
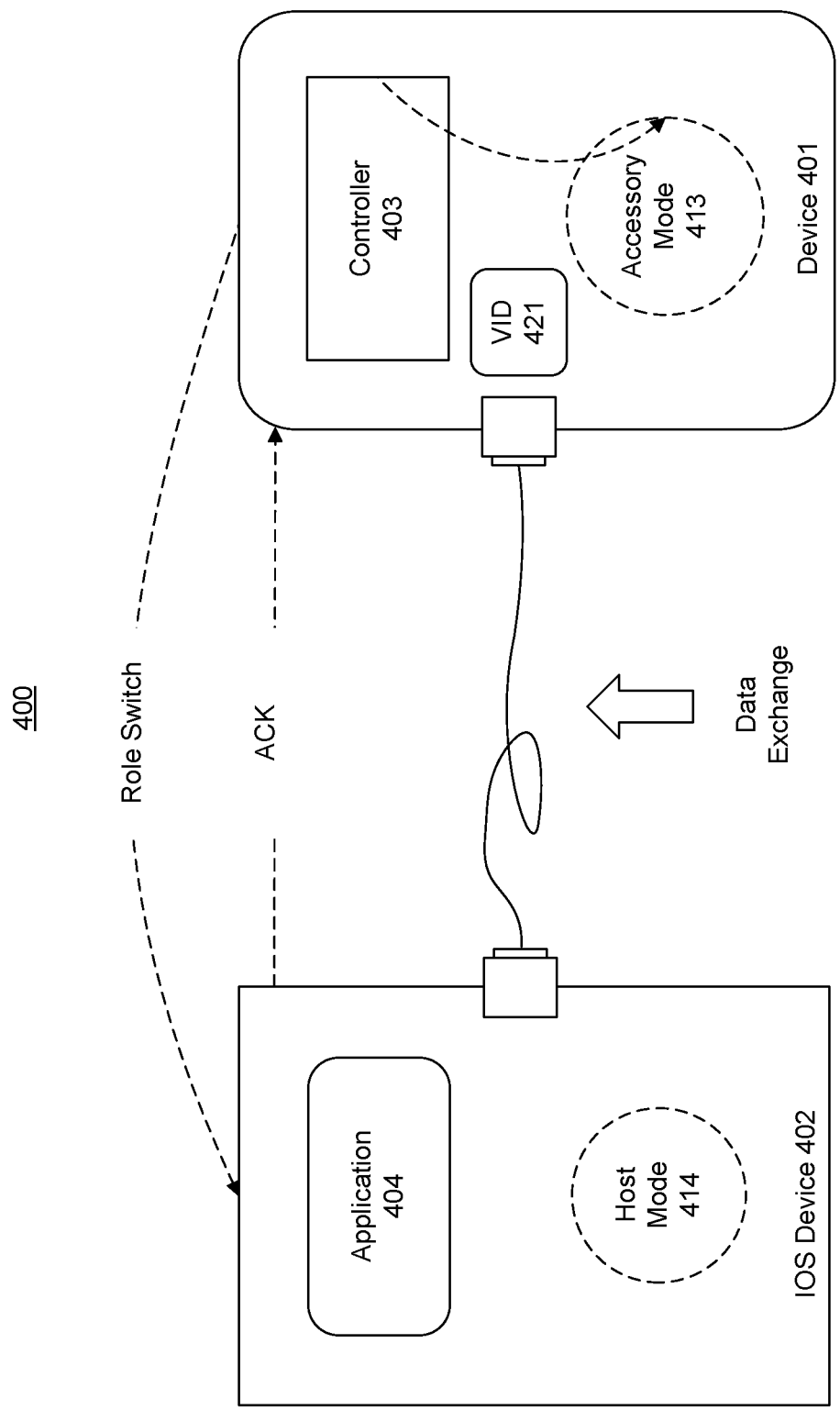
FIG. 4 is an exemplary illustration of a third party device using an accessory mode for connecting with an IOS device in a heterogeneous environment, in accordance with various embodiments of the present invention.

FIG. 4 is an exemplary illustration of a third party device using an accessory mode for connecting with an IOS device in a heterogeneous environment, in accordance with various embodiments of the present invention. As shown in FIG. 4, a device 401 can connect with a device 402 in a heterogeneous environment 400.

Furthermore, once the device 402 connects with the device 401, the controller 403 on the device 401 can detect a vendor identifier (VID) 421 for the device 402. For example, if the VID is "05AC," then the device 402 is in an IOS device. The IOS device 402 can provide a MFI connection interface for connecting with the third-party accessory, such as the device 401. The MFI interface may include several modes: such as DEVICE MODE, HOST MODE, and ROLE SWITCH.

The controller 403 on the device 401 can send a ROLE SWITCH command to the IOS device 402 for instructing the IOS device 402 to entering into the HOST MODE. Also, the controller 403 on the device 401 can configure the device 401 to be in an accessory mode. For example, the controller 403 on the device 401 can reverse the USB OTG role from the default USB HOST MODE to the USB DEVICE MODE. Then, the device 401 can wait for a host node (i.e. the IOS device 402) to initiate a data communication.

Thus, the IOS device 402 in the USB HOST MODE can establish a data connection with the device 401 by taking advantage of the MFI interface. For example, the IOS application 404 can take advantage of the MFI EA NATIVE TRANSPORT API interface for exchanging data with the third-party accessories, such as the device 401.

Figure 5:
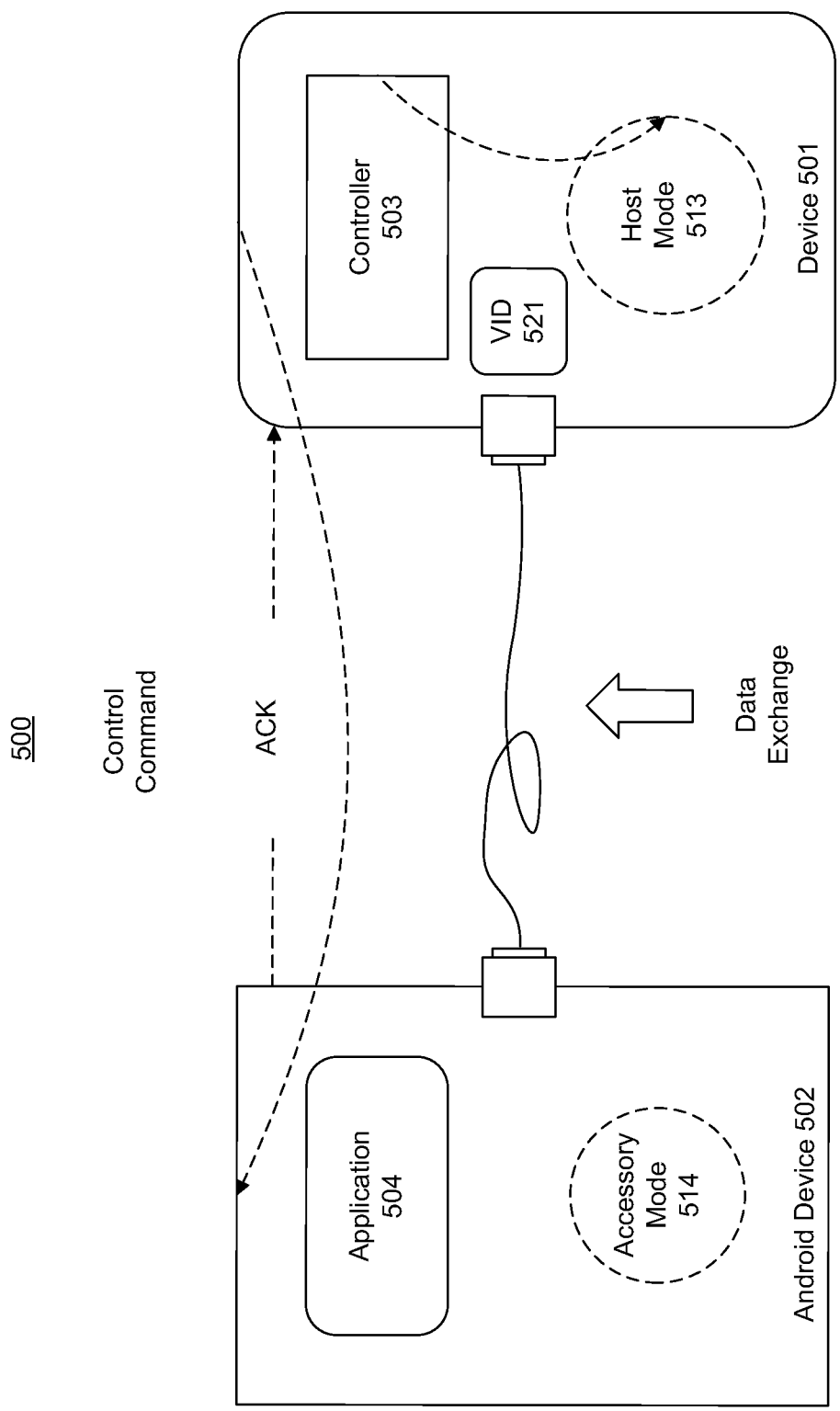
FIG. 5 is an exemplary illustration of a third party device using a host mode for connecting with an ANDROID device in a heterogeneous environment, in accordance with various embodiments of the present invention.

FIG. 5 is an exemplary illustration of a third party device using a host mode for connecting with an ANDROID device in a heterogeneous environment, in accordance with various embodiments of the present invention. As shown in FIG. 5, a device 501 can connect with a device 502 in a heterogeneous environment 500.

Furthermore, once the device 502 connects with the device 501, the controller 503 can detect a vendor identifier (VID) 521 for the device 502. For example, if the VID: PID is "18D1:2D00" or "18D1:2D01," then the device 502 is identified as an Android device.

The ANDROID device 502 provides an AOA connection interface for connecting with the third-party accessories. Also, the Android AOA connection interface can be provided in an accessory mode, e.g. using a USB DEVICE mode.

The device 501, which is in a host mode as default, can send a message to the ANDROID device 502 for establishing the data communication, via an API based on the AOA protocol. For example, the application 504, which is an ANDROID APP, can use the AOA-based API for supporting data exchange with third-party accessories, such as the device 501.

On the other hand, if the VID 521 is not recognizable, then the device 501 may try to send a control command to the device 502, for instructing the device 502 to enter into the AOA mode explicitly. If the acknowledgment (ACK) is successful, then the controller 503 can assume that the device 502 supports the AOA mode, and the controller can communicate data with the device 502, via an AOA related API.

If the acknowledgment (ACK) is not successful, e.g. if the device 502 fails to respond to the device 501 or responds with an error message, the device 501 may decide to ignore the device 502.

Figure 6:
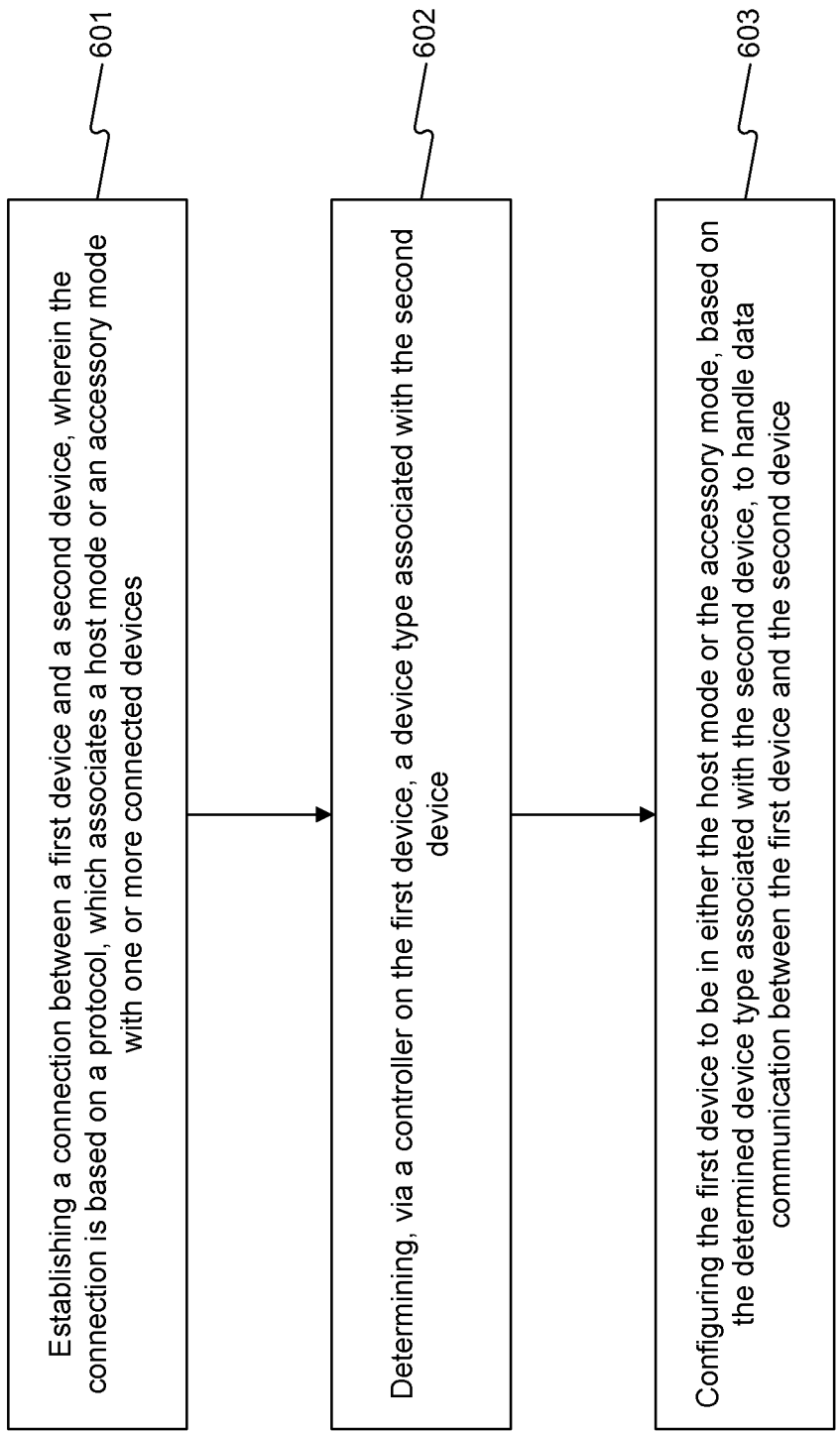
FIG. 6 shows a flowchart of supporting data communication in a heterogeneous environment, in accordance with various embodiments of the present invention.

FIG. 6 shows a flowchart of supporting data communication in a heterogeneous environment, in accordance with various embodiments of the present invention. As shown in FIG. 6, at step 601, a connection can be established between a first device and a second device, wherein the connection is based on a protocol, which associates a host mode or an accessory mode with one or more connected devices. Then, at step 602, a controller on the first device can determine that a device type associated with the second device. Furthermore, at step 603, the controller on the first device can configure the first device to be in either the host mode or the accessory mode, based on the determined device type associated with the second device, to handle data communication between the first device and the second device.

Many features of the present invention can be performed in, using, or with the assistance of hardware, software, firmware, or combinations thereof. Consequently, features of the present invention may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/ containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting data communication in a heterogeneous environment, comprising:
   establishing a connection between a first device and a second device, wherein the connection is based on a protocol, which associates a host mode or an accessory mode with one or more connected devices;
   determining, via a controller on the first device, a device type associated with the second device based on a mobile device platform installed on the second device, wherein determining the device type comprises:
   detecting an identifier value associated with the mobile device platform installed on the second device;
   identifying the mobile device platform installed on the second device based on whether the detected identifier value matches a predetermined value corresponding to the mobile device platform; and
   determining the device type based on the identified mobile device platform;
   configuring the first device to be in either the host mode or the accessory mode, based on the determined device type associated with the second device, to handle data communication between the first device and the second device; and
   exchanging data between the first device and an application running on the second device via a communication interface associated with the mobile device platform installed on the second device.

2. The method of claim 1, further comprising:
using a socket on the first device to connect the first device with different types of devices associated with different mobile device platforms.

3. The method of claim 2, wherein:
the socket is adapted to serve as a charging interface that is associated with the different types of devices.

4. The method of claim 2, further comprising:
using a first communication interface to exchange data between the first device and the second device, after the first device is connected with the second device.

5. The method of claim 4, further comprising:
connecting a third device with the first device via the socket, wherein the third device has a different device type based on a different mobile device platform from the second device, and
using a second communication interface to exchange data between the first device and the third device, after the first device is connected with the third device.

6. The method of claim 1, further comprising:
using a device descriptor to determine the device type associated with the second device.

7. The method of claim 6, wherein:
the device descriptor includes a vendor identifier (VID) and/or a product identifier (PID).

8. The method of claim 1, further comprising:
allowing the first device to be in the host mode as default.

9. The method of claim 8, further comprising:
switching the first device from the host mode into the accessory mode when the second device is a particular device type,
sending a role switching message to the second device, and
waiting for the second device to initiate a data communication.

10. The method of claim 1, further comprising:
sending a message from the first device to the second device to initiate a data communication when the first device is in the host mode.

11. The method of claim 10, further comprising:
ignoring the second device if the second device fails to respond to the first device or responds with an error message.

12. The method of claim 1, further comprising:
sending one or more video data from the first device to an application on the second device, and
receiving, via the first device, one or more commands from the application on the second device.

13. The method of claim 1, wherein:
the controller on the first device operates to check whether the second device is associated with a closed system before checking whether the second device is associated with an open system.

14. The method of claim 1, further comprising:
establishing another connection between the first device and the second device, wherein said another connection is based on a wireless protocol.

15. A system for supporting data communication in a heterogeneous environment, comprising:
one or more microprocessors;
a controller running on the one or more microprocessors, wherein the controller operates to:
establish a connection between a first device and a second device, wherein the connection is based on a protocol, which associates a host mode or a device mode with one or more connected devices;
determine a device type associated with the second device based on a mobile device platform installed on the second device, wherein determining the device type comprises:
detecting an identifier value associated with the mobile device platform installed on the second device;
identifying the mobile device platform installed on the second device based on whether the detected identifier value matches the predetermined value corresponding to the mobile device platform; and
determining the device type based on the identified mobile device platform;
configure the first device to be in either the host mode or the device mode, based on the determined device type associated with the second device, to handle data communication between the first device and the second device; and
exchange data between the first device and an application running on the second device via a communication interface associated with the mobile device platform installed on the second device.

16. The system of claim 15, further comprising:
a socket on the first device that is adapted to connect the first device with different types of devices associated with different mobile device platforms.

17. The system of claim 16, wherein:
the socket is adapted to serve as a charging interface that is associated with the different types of devices.

18. The system of claim 17, wherein:
a third device is connected with the first device via the socket, wherein the third device has a different device type based on a different mobile device platform from the second device, and the first device uses a second communication interface to exchange data between the first device and the third device, after the first device is connected with the third device.

19. The system of claim 16, wherein:
the first device uses a first communication interface that operates to exchange data between the first device and the second device, after the first device is connected with the second device.

20. The system of claim 15, wherein:
the controller operates to use a device descriptor to determine the device type associated with the second device.

21. The system of claim 20, wherein:
the device descriptor includes a vendor identifier (VID) and/or a product identifier (PID).

22. The system of claim 15, wherein the first device is configured to be in the host mode as default.

23. The system of claim 21, wherein the controller operates to:
switch the first device from the host mode into the accessory mode when the second device is in a particular device type,
send a role switching message to the second device, and
wait for the second device to initiate a data communication.

24. The system of claim 15, wherein:
the first device operates to send a message to the second device to initiate a data communication when the first device is in the host mode.

25. The system of claim 24, wherein:
the first device operates to ignore the second device if the second device fails to respond to the first device or responds with an error message.

26. The system of claim 15, wherein the first device operates to:
send one or more video data from the first device to an application on the second device, and
receive one or more commands from the application on the second device.

27. The system of claim 15, wherein:
the controller on the first device operates to check whether the second device is associated with a closed system before checking whether the second device is associated with an open system.

28. The system of claim 15, wherein:
another connection is established between the first device and the second device, wherein said another connection is based on a wireless protocol.

29. A non-transitory computer-readable medium with instructions stored thereon, that when executed by a processor, perform the steps comprising:
establishing a connection between a first device and a second device, wherein the connection is based on a protocol, which associates a host mode or a device mode with one or more connected devices;
determining, via a controller on the first device, a device type associated with the second device based on a mobile device platform installed on the second device, wherein determining the device type comprises:
detecting an identifier value associated with the mobile device platform installed on the second device;
identifying the mobile device platform installed on the second device based on whether the detected identifier value matches a predetermined value corresponding to the mobile device platform; and
determining the device type based on the identified mobile device platform;
configuring the first device to be in either a host mode or a device mode, based on the determined device type associated with the second device, to handle data communication between the first device and the second device; and
exchanging data between the first device and an application running on the second device via a communication interface associated with the mobile device platform installed on the second device.

30. A system for supporting data communication in a heterogeneous environment, comprising:
a socket provided on a first device, wherein the socket is used to establish a connection between the first device and a second device, wherein the connection is based on a protocol, which associates a host mode or an accessory mode with one or more connected devices; and a memory associated with a processing unit, wherein the memory stores instructions and the processing unit is configured to execute the instructions to:
   determine a device type associated with the second device based on a mobile device platform installed on the second device, wherein determining the device type comprises:
      detecting an identifier value associated with the mobile device platform installed on the second device;
      identifying the mobile device platform installed on the second device based on whether the detected identifier value matches a predetermined value corresponding to the mobile device platform; and
      determining the device type based on the identified mobile device platform;
   configure the first device to be in either a host mode or an accessory mode, based on the determined device type associated with the second device, to handle data communication between the first device and the second device; and
   exchange data between the first device and an application running on the second device via a communication interface associated with the mobile device platform installed on the second device.

* * * * *